US010798791B2

(12) United States Patent
Zhang

(10) Patent No.: US 10,798,791 B2
(45) Date of Patent: Oct. 6, 2020

(54) LIGHT EMITTING DIODE EMERGENCY VEHICLE LIGHT BASED ON TRAFFIC DETECTION

(71) Applicant: YUYAO FEITE PLASTIC CO., LTD., Yuyao, Zhejiang Province (CN)

(72) Inventor: Shanqin Zhang, Yuyao (CN)

(73) Assignee: YUTAO FEITE PLASTIC CO., LTD., Yuyao (CN)

(*) Notice: Subject to any disclaimer, the term of this patent is extended or adjusted under 35 U.S.C. 154(b) by 0 days.

(21) Appl. No.: 16/474,752

(22) PCT Filed: Jun. 30, 2017

(86) PCT No.: PCT/CN2017/091146
§ 371 (c)(1),
(2) Date: Jun. 28, 2019

(87) PCT Pub. No.: WO2018/223453
PCT Pub. Date: Dec. 13, 2018

(65) Prior Publication Data
US 2019/0320512 A1 Oct. 17, 2019

(30) Foreign Application Priority Data

Jun. 6, 2017 (CN) .......................... 2017 1 0418122

(51) Int. Cl.
H05B 45/10 (2020.01)
F21S 45/50 (2018.01)
(Continued)

(52) U.S. Cl.
CPC ........... *H05B 45/10* (2020.01); *B60Q 1/2607* (2013.01); *B60Q 1/2611* (2013.01);
(Continued)

(58) Field of Classification Search
CPC ....... H05B 45/10; F21S 45/50; B60Q 1/2607; B60Q 1/2611; B60Q 1/2696; B60Q 1/46
(Continued)

(56) References Cited

U.S. PATENT DOCUMENTS 6,461,008 B1 * 10/2002 Pederson ............. B60Q 1/2611
362/35
2002/0048173 A1 * 4/2002 Schmucker .......... B60Q 1/2611
362/487
(Continued)

FOREIGN PATENT DOCUMENTS

CN 201259131 Y 6/2009
CN 201425781 Y 3/2010
(Continued)

OTHER PUBLICATIONS

International Search Report issued in International Application No. PCT/CN2017/091146/, dated Mar. 7, 2018.
(Continued)

Primary Examiner — Daryl C Pope
(74) Attorney, Agent, or Firm — Charles C. Achkar; Ostrolenk Faber LLP.

(57) ABSTRACT

A traffic flow detection-based LED alarm lamp includes a red LED device, a blue LED device, an alarm lamp leg, a mounting assembly and a reinforcing plate. The red LED device and the blue LED device are installed parallel to each other and fixed to the top of a police car through the alarm lamp leg. The mounting assembly includes a nut and a bolt for fixing the alarm lamp leg to the top of the police car, and a reinforcing plate installed onto an inner side of a police car rooftop for reinforcing the fixation of the alarm lamp leg. The red LED device emits light with a first lighting frequency and the blue LED device emits light with a second lighting frequency. This invention can improve the warning effect of the LED alarm lamp.

5 Claims, 1 Drawing Sheet

(51) Int. Cl.
*B60Q 1/26* (2006.01)
*B60Q 1/46* (2006.01)

(52) U.S. Cl.
CPC .............. *B60Q 1/2696* (2013.01); *B60Q 1/46* (2013.01); *F21S 45/50* (2018.01)

(58) Field of Classification Search
USPC ........... 340/471, 815.4, 815.45, 472; 362/35, 362/487, 542, 545, 800
See application file for complete search history.

(56) References Cited

U.S. PATENT DOCUMENTS

| | | | | |
|---|---|---|---|---|
| 2002/0105432 A1* | 8/2002 | Pederson | ............ | B60Q 1/2611 340/815.45 |
| 2009/0102229 A1* | 4/2009 | Wiechowski | .......... | B60J 1/1823 296/121 |
| 2018/0345853 A1* | 12/2018 | Gao | ..................... | B60Q 1/2611 |

FOREIGN PATENT DOCUMENTS

| | | |
|---|---|---|
| CN | 203595069 U | 5/2014 |
| CN | 104633571 A | 5/2015 |
| CN | 205155731 U | 4/2016 |
| JP | 2001297607 A | 10/2001 |
| JP | 2002245804 A | 8/2002 |

OTHER PUBLICATIONS

Written Opinion of the International Searching Authority issued in International Application No. PCT/CN2017/091146/, dated Mar. 7, 2018.

* cited by examiner

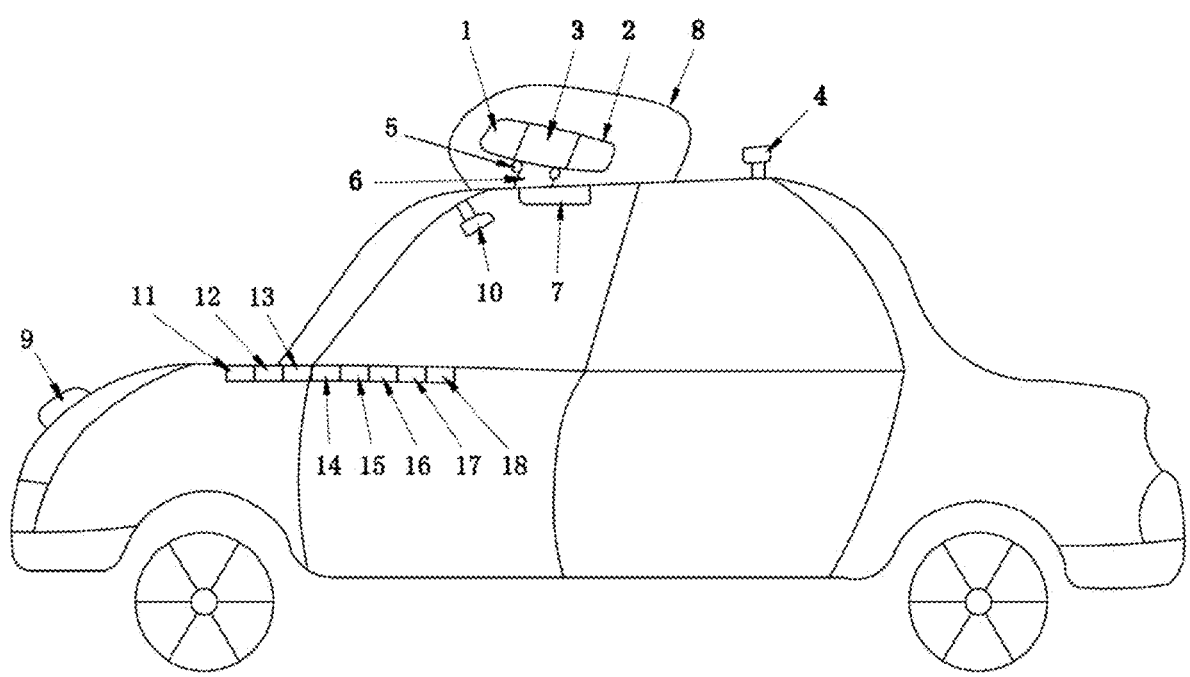

US 10,798,791 B2

LIGHT EMITTING DIODE EMERGENCY VEHICLE LIGHT BASED ON TRAFFIC DETECTION

CROSS REFERENCE TO RELATED APPLICATIONS

The present application is a § 371 National Stage application based on PCT/CN2017/091146 filed Jun. 30, 2017, which claims the benefit of China Application No. 201710418122.6 filed Jun. 6, 2017, the subject matter of each of which is incorporated by reference in their entirety.

FIELD OF THE INVENTION

The present invention relates to the field of light emitting diode (LED) alarm lamps, and more particularly to a traffic flow detection-based LED alarm lamp.

BACKGROUND OF THE INVENTION

Special vehicles such as police cars, fire engines, ambulances, etc. are not restricted by traffic lights and may drive the wrong way when using a siren in a mission, and surrounding pedestrians and vehicles are obligated to give way to these vehicles timely. However, the premise is to have the siren legally installed and issued, otherwise these vehicles will be punished theoretically. This is the legal privilege and responsibility of these special vehicles.

In addition, police cars have to turn on the siren during the process of handling emergency cases. The siren not just clears the way for the police cars to get to the crime scene in the first time only, but also provides a deterrent effect to scare a criminal suspect away. In the event of an emergency, there is no warning in advance, and a police officer only has a response plan for the emergency, but no specific action plan. In other words, the police car rushes to the crime scene to rescue victims or handle the emergency situation. The main purpose is to minimize the damage, rather than blindly arresting the criminal suspect.

Therefore, an alarm lamp with a siren can be used to scare away the criminal suspect in order to stop the crime and protect the victim's life and property. Even though the level of difficulty of seizing the criminal suspect afterward has increased naturally, it is much better than scarifying the life of an innocent person.

However, both red and blue lighting frequencies of the conventional alarm lamp are fixed and equal, and the two frequencies are used to emit light alternately. If the traffic in front is heavy, the relatively slow fixed mode of the lighting frequency is obviously insufficient for reminding the vehicles ahead.

SUMMARY OF THE INVENTION

Therefore, it is a primary objective of the present invention to overcome the aforementioned drawbacks of the prior art by providing a traffic flow detection-based LED alarm lamp capable of identifying a car body in the front from a front image, obtaining the quantity of vehicle targets in the front image and using it as the output of the quantity of current front vehicles, and determining whether to use a red light with a first lighting frequency or a blue light with a second lighting frequency based on the quantity of current front vehicles. The greater the quantity of current front vehicles, the higher the first lighting frequency, and the lower the second lighting frequency. The sum of the first lighting frequency and the second lighting frequency is a constant.

To achieve the aforementioned and other objectives, the present invention provides a traffic flow detection-based LED alarm lamp comprising: a red LED device (1), a blue LED device (2), an alarm lamp leg (5), a mounting assembly (6) and a reinforcing plate (7), the red LED device (1) and the blue LED (2) device being installed parallel to each other and fixed to the top of police car through the alarm lamp leg (5), and the mounting assembly (6) including a nut and a bolt for fixing the alarm lamp leg (5) to the top of police car, and a reinforcing plate (7) being installed onto an inner side of a police car rooftop for reinforcing the fixation of the alarm lamp leg (5).

Wherein, the red LED device (1) emits light with a first lighting frequency, and the blue LED device (2) emits light with a second lighting frequency.

Specifically, the traffic flow detection-based LED alarm lamp further comprises a light emission driving part (3) installed between the red LED device (1) and the blue LED device (2) and coupled to the red LED (1) device and the blue LED device (2).

Wherein, the light emission driving part (3) is provided for controlling the red LED device (1) to emit light with the first lighting frequency and controlling the blue LED device (2) to emit light with the second lighting frequency.

Specifically, the traffic flow detection-based LED alarm lamp further comprises a rainfall detection device (4) installed at the top of the police car for detecting and outputting the current rainfall near the top of the police car.

Specifically, the traffic flow detection-based LED alarm lamp further comprises a retractable rain cover (8) disposed around the periphery of the red LED (1) device and the periphery of the blue LED device (2) for automatically opening the retractable rain cover (8) to block rain from falling on the red LED device (1) and the blue LED device (2) when receiving an opening control signal and to automatically fold the retracting the retractable rain cover (8) to stop blocking rain from falling on the red LED device (1) and the blue LED device (2) when receiving the retracting control signal.

The traffic flow detection-base LED alarm lamp further comprises: an image sensing device (9), installed at the top of the police car, for performing an image data sensing operation at the front facing the car body to obtain and output a current front image;

a first filtering device (11), for executing the following filtering: using a HARR wavelet basis with a length of 6 to execute a five-level composition of the received image and a reconstruction to obtain a filtered image outputted by the first filtering device (11)

a second filtering device (12), for executing the following filtering: using various filtering windows to obtain various corresponding blocks of each pixel of the received image by using the pixel as a center, determining the grayscale value variance of the various blocks, selecting a filtering window corresponding to the smallest grayscale value variance as a target filtering window to carry out a median filtering of the pixel value of the pixel to obtain the filtered pixel value, and obtaining the filtered image outputted by the second filtering device (12) based on the filtered pixel values of all pixels of the received image;

a self-adjusting recursive filtering device (13), for executing for executing the following filtering: executing a self-adjusting recursive filtering of the received image to obtain a filtered image outputted by the self-adjusting recursive filtering device (13);

a first image initial detection device (14), coupled to the image sensing device (9), for receiving a current front image, determining a mean square error of the current front image pixel value based on the pixel value of each pixel of the current front image and use said mean square error as the output of a target mean square error;

a second image initial detection device (15), for receiving a current front image, performing a noise analysis of the current front image to obtain a primary noise signal with the largest noise amplitude and a secondary noise signal with the second largest noise amplitude, determining a signal-to-noise ratio of the current front image based on the primary noise signal, the secondary noise signal and the current front image and using said signal-to-noise ratio as the output of a target signal-to-noise ratio;

a DSP control chip (16), coupled to the self-adjusting recursive filtering device (13), the first filtering device (11), the second filtering device (12), the first image initial detection device (14) and the second image initial detection device (15), for receiving the target mean square error and the target signal-to-noise ratio, and if the target signal-to-noise ratio is smaller than or equal to predetermined signal-to-noise ratio threshold and the target mean square error is greater than or equal to the predetermined mean square error threshold, the first filtering device (11) and the second filtering device (12) will be used sequentially to execute a filtering of the current front image to obtain a processed image, and if the target signal-to-noise ratio is smaller than or equal to the predetermined signal-to-noise ratio threshold and the target mean square error is greater than the predetermined mean square error threshold, then the second filtering device (12) will be used for a filtering of the current front image to obtain a processed image, and if the target signal-to-noise ratio is greater than the predetermined signal-to-noise ratio threshold and the target mean square error is greater than or equal to the predetermined mean square error threshold, then the first filtering device (11) will be used to execute a filtering of the current front image to obtain a processed image, and if the target signal-to-noise ratio is greater than the predetermined signal-to-noise ratio threshold and the target mean square error is smaller than predetermined the mean square error threshold, then the self-adjusting recursive filtering device (13) will be used to execute a filtering of the current front image to obtain a processed image;

a human detection device, coupled to the DSP control chip (16), for receiving the processed image, performing a car body identification of the processed image to obtain the quantity of vehicle targets in the processed image and use said quantity of vehicle targets as the output of the quantity of current front vehicles;

Wherein, the light emission driving part (3) is coupled to the vehicle testing device (17) for determining the first lighting frequency based on the quantity of current front vehicles, and determining the second lighting frequency based on the quantity of current front vehicles Wherein, the larger the quantity of current front vehicles, the higher the first lighting frequency, and the lower the second lighting frequency. The sum of the first lighting frequency and the second lighting frequency is a constant.

In the mounting assembly (6) of the traffic flow detection-based LED alarm lamp, there are a plurality of nuts and a plurality of bolts, and the quantity of the nuts is equal to the quantity of the bolts.

Specifically, the traffic flow detection-based LED alarm lamp further comprises a static storage device (18) coupled to the DSP control chip (16) for pre-storing a predetermined signal-to-noise ratio threshold and a predetermined mean square error threshold.

In the traffic flow detection-based LED alarm lamp, the alarm lamp leg (5) and the reinforcing plate (7) are made of a same material.

Specifically, the traffic flow detection-based LED alarm lamp further comprises a liquid crystal display device (10) installed at the top of police car and coupled to the light emission driving part (3) for displaying the quantity of current front vehicles, the first lighting frequency and the second lighting frequency instantly.

BRIEF DESCRIPTION OF THE DRAWING

FIG. 1 is an illustration of a traffic flow detection-based LED alarm lamp fixed to a police car, the traffic flow detection-based LED alarm lamp comprising: a red light-emitting diode (LED) device (1); a blue LED device (2); a light emission driving part (3); a rainfall detection device (4); an alarm lamp leg (5); a mounting assembly (6); a reinforcing plate (7); a retractable rain cover (8); an image sensing device (9); a liquid crystal display device (10); first filtering device (11); a second filtering device (12); a self-adjusting recursive filtering device (13); a first image initial detection device (14); a second image initial detection device (15); a DSP control chip (16); a vehicle testing device (17); and a static storage device (18).

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

At present, LED alarm lamps generally come with a red LED (1) device and a blue LED device (2), and both red and blue lights are visible lights with a good warning effect. The red LED device (1) and the blue LED device (2) of the LED alarm lamp emit lights alternately to remind vehicles in the front, so that the vehicles in the front can know the situation timely and give way to the police car and let the police car pass through safely.

However, the lighting frequency of the red LED device (1) and the lighting frequency of the blue LED device (2) of the conventional LED alarm lamp are fixed, and the lighting frequencies of both red and blue LED devices are equal. If the traffic in the front is heavy, then the reminding effect of such lighting mode will be very limited. To overcome the aforementioned deficiency, the present invention provides a traffic flow detection-based LED alarm lamp to overcome the aforementioned technical issue of the prior art.

With reference to FIG. 1 for a structural block diagram of a traffic flow detection-based LED alarm lamp in accordance with an embodiment of the present invention, the traffic flow detection-based LED alarm lamp comprises a red LED device (1), a blue LED device (2), an alarm lamp leg (5), a mounting assembly (6) and a reinforcing plate (7), and the red LED device (1) and the blue LED device (2) are installed parallel to each other and fixed to the top of police car through the alarm lamp leg (5), and the mounting assembly (6) includes a nut and a bolt for fixing the alarm lamp leg (5)

to the top of police car, and a reinforcing plate (7) is installed onto an inner side of a police car rooftop for reinforcing the fixation of the alarm lamp leg (5);

Wherein, the red LED device (1) emits light with a first lighting frequency, and the blue LED device (2) emits light with a second lighting frequency.

The specific structure of the traffic flow detection-based LED alarm lamp of the present invention will be described below.

The traffic flow detection-based LED alarm lamp further comprises a light emission driving part (3) installed between the red LED device (1) and the blue LED device (2) and coupled to the red LED device (1) and the blue LED device (2).

Wherein, the light emission driving part is provided for controlling the red LED device (1) to emit light with the first lighting frequency and controlling the blue LED device (2) to emit light with the second lighting frequency.

The traffic flow detection-based LED alarm lamp further comprises a rainfall detection device (4) installed to the top of police car for detecting and outputting the current rainfall near the top of the police car.

The traffic flow detection-based LED alarm lamp further comprises:

a retractable rain cover (8), disposed around the periphery of the red LED device (1) and the periphery of the blue LED device (2) for automatically opening the retractable rain cover (8) to block rain from falling on the red LED device (1) and the blue LED device (2) when receiving an opening control signal and to automatically fold the retracting the retractable rain cover (8) to stop blocking rain from falling on the red LED device (1) and the blue LED device (2) when receiving the retracting control signal;

an image sensing device (9), installed at the top of the police car, for performing an image data sensing operation at the front facing the car body to obtain and output a current front image;

a first filtering device (11), for executing the following filtering: using a HARR wavelet basis with a length of 6 to execute a five-level composition of the received image and a reconstruction to obtain a filtered image outputted by the first filtering device;

a second filtering device (12), for executing the following filtering: using various filtering windows to obtain various corresponding blocks of each pixel of the received image by using the pixel as a center, determining the grayscale value variance of the various blocks, selecting a filtering window corresponding to the smallest grayscale value variance as a target filtering window to carry out a median filtering of the pixel value of the pixel to obtain the filtered pixel value, and obtaining the filtered image outputted by the second filtering device (12) based on the filtered pixel values of all pixels of the received image;

a self-adjusting recursive filtering device (13), for executing the following filtering: executing a self-adjusting recursive filtering of the received image to obtain a filtered image outputted by the self-adjusting recursive filtering device (13);

a first image initial detection device (14), coupled to the image sensing device (9), for receiving a current front image, determining a mean square error of the current front image pixel value based on the pixel value of each pixel of the current front image and use said mean square error as the output of a target mean square error;

a second image initial detection device (15), for receiving a current front image, performing a noise analysis of the current front image to obtain a primary noise signal with the largest noise amplitude and a secondary noise signal with the second largest noise amplitude, determining a signal-to-noise ratio of the current front image based on the primary noise signal, the secondary noise signal and the current front image and using said signal-to-noise ratio as the output of a target signal-to-noise ratio;

coupled to the self-adjusting recursive filtering device (13), the first filtering device (11), the second filtering device, the first image initial detection device (14) and the second image initial detection device (15), for receiving the target mean square error and the target signal-to-noise ratio, and if the target signal-to-noise ratio is smaller than or equal to the predetermined signal-to-noise ratio threshold and the target mean square error is greater than or equal to the predetermined mean square error threshold, then the first filtering device (11) and the second filtering device (12) will be used sequentially to execute the filtering of the current front image to obtain a processed image, and if the target signal-to-noise ratio is smaller than or equal to the predetermined signal-to-noise ratio threshold and the target mean square error is greater than the predetermined mean square error threshold, then the second filtering device (12) will be used to execute a filtering of the current front image to obtain a processed image, and if the target signal-to-noise ratio is greater than the predetermined signal-to-noise ratio threshold and the target mean square error is greater than or equal to the predetermined mean square error threshold, then the first filtering device (11) will be used to execute a filtering of the current front image to obtain a processed image, and if the target signal-to-noise ratio is greater than the predetermined signal-to-noise ratio threshold and the target mean square error is smaller than the predetermined mean square error threshold, then the self-adjusting recursive filtering device (13) will be used to execute a filtering of the current front image to obtain a processed image;

a human detection device, coupled to the DSP control chip (16), for receiving the processed image, and performing a car body identification of the processed image to obtain the quantity of vehicle targets in the processed image and use said quantity of vehicle targets as the output of the quantity of current front vehicles.

Wherein, the light emission driving part (3) is coupled to the human detection device for determining the first lighting frequency based on the quantity of the current front vehicles, and determining the second lighting frequency based on the quantity of the current front vehicles;

Wherein, the greater the quantity of current front vehicles, the higher the first lighting frequency, and the lower the second lighting frequency. The sum of the first lighting frequency and the second lighting frequency is a constant.

In the mounting assembly (6) of the traffic flow detection-based LED alarm lamp, there are a plurality of the nuts and a plurality of the bolts, and the quantity of the nuts is equal to the quantity of the bolts.

The traffic flow detection-based LED alarm lamp further comprises a static storage device (18) coupled to the DSP control chip (16) for pre-storing a predetermined signal-to-noise ratio threshold and a predetermined mean square error threshold.

In the traffic flow detection-based LED alarm lamp, the alarm lamp leg (5) and the reinforcing plate (7) are made of a same material.

The traffic flow detection-based LED alarm lamp further comprises a liquid crystal display device (10) installed at the top of a police car and coupled to the light emission driving part for displaying the quantity of current front vehicles, the first lighting frequency and the second lighting frequency instantly.

Wherein, a digital signal processing (DSP) chip may be used as the target analysis device. The interior of the DSP chip adopts the Harvard structure with the program and data separated from one another and having a dedicated hardware multiplier. Such DSP chip widely uses the pipeline operations and provides specific DSP commands, so that the DSP chip can be used to implement various different digital signal processing algorithms quickly.

According to the digital signal processing requirements, the DSP chip generally has the following main features: (1) Multiplication and addition can be completed in a command cycle. (2) Program and data spaces are separated, so that both command and data can be accessed simultaneously. (3) The DSP chip has a fast RAM installed therein, so that both commands and data can be accessed through an independent data bus. (4) The DSP chip has a hardware support with low-overhead or no-overhead loop and jumps. (5) The DSP provides a quick interrupt and hardware I/O support. (6) The DSP chip has a plurality of hardware address generator operated in a single cycle. (7) The DSP chip can execute a plurality of operations. (8) The DSP supports pipeline operations, so that the operation including fetch, decode, and execution can be carried out in an overlapped manner.

The DSP chips can be divided according to the data format used for the operation of the chip. A DSP chip using a fixed-point data format for the operation is called a fixed-point DSP chip, such as TI's TMS320C1X/C2X, TMS320C2XX/C5X, TMS320C54X/C62XX series, AD's ADSP21XX series, AT&T's DSP16/16A, Motorola's MC56000, etc. A DSP chip using a floating-point data format for the operation is called a floating-point DSP chip such as TI's TMS320C3X/C4X/C8X, AD's ADSP21XXX series, AT&T's DSP32/32C, Motorola's MC96002, etc.

Different floating-point DSP chips adopt different floating-point data format, and some DSP chips such as TMS320C3X adopt a self-defined floating-point format, and some DSP chips such as Motorola's MC96002, Fujitsu's MB86232, Zoran's ZR35325, etc. adopt IEEE floating-point format.

The traffic flow detection-based LED alarm lamp of the present invention overcomes the drawback of the simple lighting mode of the conventional LED alarm lamp and provides a high-precision image identification of the front vehicle in an image and self-adjusting the lighting mode of the LED alarm lamp based on the quantity of front vehicles to ensure a good prompting effect of different traffic flows.

While the present invention has been described by means of specific embodiments, numerous modifications and variations could be made thereto by those skilled in the art without departing from the scope and spirit of the present invention set forth in the claims.

What is claimed:

1. A traffic flow detection-based LED alarm lamp, comprising a red LED device, a blue LED device, an alarm lamp leg, a mounting assembly and a reinforcing plate, the red LED device and the blue LED device being installed parallel to each other and fixed to the top of a police car, said police car having a top, an inner side, a front, and body, through the alarm lamp leg, and the mounting assembly including a nut and a bolt for fixing the alarm lamp leg to the top of the police car, and a reinforcing plate being installed onto an inner side of a police car rooftop for reinforcing the fixation of the alarm lamp leg; wherein the red LED device emits light with a first lighting frequency, and the blue LED device emits light with a second lighting frequency;

and the traffic flow detection-based LED alarm lamp, further comprising a light emission driving part installed between the red LED device and the blue LED device and coupled to the red LED device and the blue LED device;

wherein the light emission driving part is provided for controlling the red LED device to emit light with the first lighting frequency and controlling the blue LED device to emit light with the second lighting frequency;

a rainfall detection device installed to the top of police car for detecting near the top of the police car;

a retractable rain cover disposed around a periphery of the red LED device and a periphery of the blue LED device for automatically opening a retractable rain cover to block rain from falling on the red LED device and the blue LED device when receiving an opening control signal and to automatically fold the retracting the retractable rain cover to stop blocking rain from falling on the red LED device and the blue LED device when receiving the retracting control signal;

an image sensing device, installed at the top of the police car, for performing an image data sensing operation at the front facing the car body to obtain and output a current front image;

a first filtering device, for executing a filtering: using a HARR wavelet basis with a length of 6 to execute a five-level composition of a received image and a reconstruction to obtain a filtered image outputted by the first filtering device;

a second filtering device, for executing a filtering: using various filtering windows to obtain various corresponding blocks of each pixel of the received image by using a pixel as a center, determining a grayscale value variance of the various blocks, selecting a filtering window corresponding to a smallest grayscale value variance as a target filtering window to carry out a median filtering of a pixel value of the pixel to obtain a filtered pixel value, and obtaining a filtered image outputted by the second filtering device based on the filtered pixel values of all pixels of the received image;

a self-adjusting recursive filtering device, for executing the following a filtering: executing a self-adjusting recursive filtering of the received image to obtain an output, wherein the output is a filtered image;

a first image initial detection device, coupled to the image sensing device, for receiving a current front image, determining a mean square error of a current front image pixel value based on a pixel value of each pixel of the current front image and use said mean square error as an output of a target mean square error;

a second image initial detection device, for receiving a current front image, performing a noise analysis of the current front image to obtain a primary noise signal with the largest noise amplitude and a secondary noise signal with the second largest noise amplitude, determining a signal-to-noise ratio of the current front image based on the primary noise signal, the secondary noise signal and the current front image and using said signal-to-noise ratio as an output of a target signal-to-noise ratio;

a DSP control chip, coupled to the self-adjusting recursive filtering device, the first filtering device, the second filtering device, the first image initial detection device and the second image initial detection device, for receiving the target mean square error and the target signal-to-noise ratio, and if the target signal-to-noise ratio is smaller than or equal to a predetermined signal-to-noise ratio threshold and the target mean square error is greater than or equal to a predetermined mean square error threshold, then the first filtering device and the second filtering device will be used sequentially to execute a filtering of the current front image to obtain a processed image, and if the target signal-to-noise ratio is smaller than or equal to the predetermined signal-to-noise ratio threshold and the target mean square error is greater than the predetermined mean square error threshold, then the second filtering device is used to execute a filtering of the current front image to obtain a processed image, and if the target signal-to-noise ratio is greater than the predetermined signal-to-noise ratio threshold and the target mean square error is greater than or equal to the predetermined mean square error threshold, then the first filtering device is used to execute a filtering of the current front image to obtain the processed image, and if the target signal-to-noise ratio is greater than the predetermined signal-to-noise ratio threshold and the target mean square error is smaller than the predetermined mean square error threshold, then the self-adjusting recursive filtering device is used to execute a filtering of the current front image to obtain the processed image;

a vehicle testing device, coupled to the DSP control chip, for receiving the processed image, performing a car body identification of the processed image to obtain a quantity of vehicle targets in the processed image and use said quantity of vehicle targets as an output of a quantity of current front vehicles;

wherein, the light emission driving part is coupled to the vehicle testing device for determining the first lighting frequency based on the quantity of current front vehicles, and determining the second lighting frequency based on the quantity of current front vehicles; wherein, the greater the quantity of current front vehicles, the higher the first lighting frequency, and the lower the second lighting frequency, and a sum of the first lighting frequency and the second lighting frequency is a constant.

2. The traffic flow detection-based LED alarm lamp according to claim 1, wherein in the mounting assembly, there are a plurality of nuts and a plurality of bolts, and a quantity of the nuts is equal to a quantity of the bolts.

3. The traffic flow detection-based LED alarm lamp according to claim 2, further comprising a static storage device coupled to the DSP control chip for pre-storing the predetermined signal-to-noise ratio threshold and the predetermined mean square error threshold.

4. The traffic flow detection-based LED alarm lamp according to claim 3, wherein the alarm lamp leg and the reinforcing plate are made of a same material.

5. The traffic flow detection-based LED alarm lamp according to claim 4, further comprising a liquid crystal display device installed at the top of the police car and coupled to the light emission driving part for displaying the quantity of current front vehicles, the first lighting frequency, and the second lighting frequency instantly.

\* \* \* \* \*